US008524127B2

(12) United States Patent
Osako

(10) Patent No.: US 8,524,127 B2

(45) Date of Patent: Sep. 3, 2013

(54) METHOD OF MANUFACTURING A PANEL WITH OCCLUDED MICROHOLES

(75) Inventor: Yasu Osako, Lake Oswego, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 534 days.

(21) Appl. No.: 12/732,851

(22) Filed: Mar. 26, 2010

(65) Prior Publication Data

US 2011/0236645 A1 Sep. 29, 2011

(51) Int. Cl.
*B29D 11/00* (2006.01)
*B29C 35/08* (2006.01)

(52) U.S. Cl.
USPC .......... 264/1.38; 264/1.37; 264/1.7; 264/400; 264/494

(58) Field of Classification Search
USPC ............... 264/1.36, 1.38, 1.7, 494, 1.37, 400, 264/482; 219/121.71, 121.69; 362/375
See application file for complete search history.

(56) References Cited

U.S. PATENT DOCUMENTS 3,440,388 A 4/1969 Ostot et al.
4,155,972 A 5/1979 Hauser et al.
4,716,270 A 12/1987 Gnanamuthu et al.
5,233,202 A 8/1993 Torii et al.
5,726,418 A 3/1998 Duthoo
5,951,349 A 9/1999 Larose et al.
6,211,485 B1 4/2001 Burgess
6,416,844 B1 7/2002 Robson
6,424,876 B1 7/2002 Cusson et al.
7,230,278 B2 6/2007 Yamada et al.
7,663,612 B2 2/2010 Bladt
2004/0032659 A1 2/2004 Drinkwater
2005/0127478 A1 6/2005 Hiatt et al.
2005/0150876 A1 7/2005 Menin et al.
2005/0224469 A1 10/2005 Cutler et al.
2007/0278703 A1 12/2007 Hardy et al.
2007/0291496 A1 12/2007 Nashner et al.
2008/0024470 A1 1/2008 Andre et al.
2008/0084404 A1* 4/2008 Andre et al. .................. 345/204
2008/0179304 A1 7/2008 Osako et al.
2008/0181269 A1 7/2008 Osako et al.
2008/0272095 A1 11/2008 Alpay et al.
2008/0272096 A1 11/2008 Alpay et al.
2008/0296272 A1 12/2008 Lei et al.
2010/0078418 A1 4/2010 Lei et al.
2010/0193481 A1 8/2010 Osako

FOREIGN PATENT DOCUMENTS

JP 07-201260 8/1995
JP 07-271309 10/1995
JP 08-215865 8/1996
JP 2005-210103 A 8/2005
KR 10-0801535 B1 2/2008
WO 2004/077388 A1 9/2004
WO 2007/142909 A2 12/2007

* cited by examiner

*Primary Examiner* — Mathieu D. Vargot
(74) *Attorney, Agent, or Firm* — Young Basile

(57) ABSTRACT

Methods of manufacturing a panel and resulting panels include a plurality of microholes arranged in a pattern and filled with light transmissive polymeric material. The light transmissive polymeric material occludes the microholes and is set, or cured, by exposure to an energy source using at least two discrete exposure periods separated by an idle or rest period.

20 Claims, 4 Drawing Sheets

METHOD OF MANUFACTURING A PANEL WITH OCCLUDED MICROHOLES

FIELD OF THE DISCLOSURE

The invention relates in general to a method of manufacturing a panel with occluded microholes and resulting products.

BACKGROUND

Projecting a light through a housing to provide information is commonplace. Examples include but are not limited to computer keyboards that include indication lights for functions such as “Caps Lock” or “Num Lock”, computer monitors that include an “on/off” light, automobiles that include lights to indicate whether heated seats are on or off, or whether an air bag is on or off; televisions with indicator lights, and a whole host of other consumer electronics.

A common way to provide for such indication lights is to provide a projecting light that is visible when the light is off and brightly lit to indicate when the light is on. A collection of lights, or holes for lights, may be disruptive to the objectives of an industrial designer.

One method of attempting to make the holes for lights less visible is to drill very small, tapered holes and fill them with a transparent material. Such holes can be formed using mechanical drills, lasers, electrical discharge machining or chemical etching. One way of forming such holes is described in co-pending U.S. patent application Ser. No. 11/742,862, assigned to the Assignee of the instant invention. Generally, methods taught therein include drilling holes, called vias therein, through a substantially opaque panel or similar article, filling them with transparent material, setting the filler material and cleaning the surface to remove excess material from the viewing surface of the article.

SUMMARY

Embodiments of the present invention improve the appearance of occluded microholes in a panel when lit. More specifically, methods are taught herein where occluded microholes have an improved level of uniformity with respect to light intensity and/or optical diameter. Products made by such methods are also taught. A microhole herein refers to a hole formed in a panel or other housing portion that extends from one surface to another that has an interior volume bounded by its interior wall(s) and planes that extend the surfaces penetrated by the hole. Microholes have small dimensions as described hereinafter and are filled with visible light transmitting material, preferably transparent material.

According to one embodiment of the present invention, a method of manufacturing a panel is taught. The method comprises, for example, occluding a plurality of microholes arranged in a pattern with a light transmissive polymeric material, the light transmissive polymeric material being in a workable state and the plurality of microholes extending from a first opening in a first surface of a substantially planar area of the panel to a second opening in a second surface of the substantially planar area opposite to the first surface, each of the first opening and the second opening having a diameter smaller than a thickness of the substantially planar area, and setting the light transmissive polymeric material occluding the plurality of microholes from the workable state to a set state in which the light transmissive polymeric material is secured to an interior surface of the plurality of microholes by exposing the visible light transmissive polymeric material to a source for a first exposure period, providing a first idle interval wherein the light transmissive polymeric material is not exposed to the source after the first exposure period and exposing the light transmissive polymeric material to the source for a second exposure period after the first idle interval.

According to another embodiment of the present invention, panels formed by the methods taught herein are described. One such panel comprises a substantially planar portion including a first planar surface and a second planar surface opposed to the first planar surface, a plurality of microholes passing from the first planar surface to the second planar surface, each microhole communicating with first and second apertures defined in the respective planar surfaces and having an internal surface therebetween, and a light transmissive polymeric material disposed within each microhole, the light transmissive polymeric material having a first outer surface substantially coplanar with the first planar surface of the body, a second outer surface opposed to the first outer surface and a central body disposed therebetween. In this embodiment, the central body of the light transmissive polymeric material has a outer central surface in contacting engagement with the internal surface, and the light transmissive polymeric material has a polymeric chain wherein at least 5% of components are derived from UV curable epoxy acrylate oligomers exposed to at least two periods of UV exposure separated by a rest interval.

Details of and variations to these embodiments and other embodiments are described herein.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
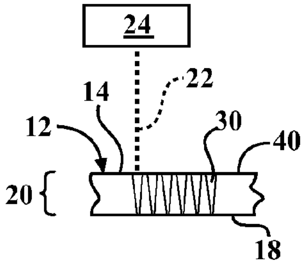
FIG. 1 is a schematic representation of laser drilling microholes in a panel.

The methods in U.S. patent application Ser. No. 11/742,862 describe a desire to produce housings or panels that include a drilled portion capable of passing light therethrough when backlit but that include holes so small that they provide a relatively unaltered appearance from the surrounding material in the absence of such a light source. That is, the holes are substantially invisible to the naked eye when they are not backlit.

However, holes having non-uniform light intensity and/or non-uniform optical diameter when backlit can result. The inventor theorized that uniformity was adversely affected by the heat generated inside the UV curable filling material during curing and developed methods taught herein as a result.

Embodiments of the present invention are easiest explained with reference to FIGS. 1-11. A panel 12 as shown in FIGS. 1-5 is a relatively thin continuous sheet of material, preferably but not necessarily a metallic sheet. Panel 12 includes a first or back surface 14 and an opposing second or front surface 18 defining a panel thickness 20. Front surface 18 is relatively smooth and substantially unbroken to the naked eye in the absence of a light source directed into microholes 30 drilled therein. Front surface 18 is also called cosmetic surface 18 herein. Panel 12 is typically made of metal, such as anodized aluminum, but other materials such as plastic or composite materials may be used. Note that although panel 12 can be a sheet material, it is not required. For example, panel 12 could be a housing portion or a lid, etc., with corners, curved outer surfaces, etc. It is desirable, however, that each drilled portion of panel 12 have a relatively uniform thickness.

Microholes 30 extend from back surface 14 to cosmetic surface 18 as shown in FIG. 1. The number of microholes 30 is not particularly limited—it is only necessary that they be sufficient in number so as to form a desired message, pattern, etc., visible to the naked eye when viewed from cosmetic surface 18 with lighting projecting into the microholes 30 from back surface 14. According to one method of drilling or machining microholes 30 in panel 12, a laser 24, such as a diode-pumped solid-state pulsed laser, is applied in a circular or spiral (trepanning) pattern. It has been shown that a Nd:YAG 355 nm spot 22 with a pulse repetition rate of 30 kHz and ~60 nanosecond pulse width is useful in machining out microholes 30. As shown, drilling is accomplished from back surface 14 through panel 12 to cosmetic surface 18. Other types of lasers with different characteristics and other machining processes known to those skilled in the art may be used to suit the particular application and thickness of panel 12.

Figure 5:
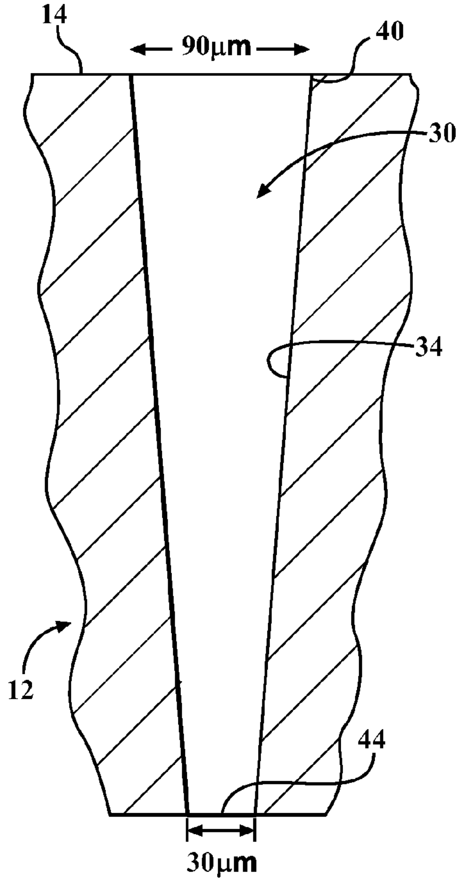
FIG. 5 is a schematic representation of the geometry of a conically-shaped microhole after the panel is laser drilled and before filling the microholes.

FIG. 5 illustrates one microhole 30 drilled as described above. Microhole 30 is formed of a conically-shaped sidewall 34 between a first opening 40 in first surface 14 and an opposing second opening 44 in cosmetic surface 18. First opening 40 is larger in diameter than second opening 44. Microholes 30 are so named as each opening 40, 44 has a diameter of preferably no more than about 100 micrometers (μm). For example, as shown in FIG. 5, first opening 40 is approximately 90-100 micrometers (μm) in diameter, and second opening 44 is approximately 30-40 micrometers (μm) in diameter.

It is understood other shapes and configurations may result from the machining process. For example, first opening 40 and second opening 44 could be substantially similar in size. Smaller or larger microholes 30 may also be formed. However, second opening 44 in cosmetic surface 18 should be such that the microholes 30 are substantially invisible to the naked eye when they are not backlit. For example, at a relatively close distance of 20-25 cm from a viewing surface, an object of about 0.05 millimeters (50 μm) is viewable without a magnifying glass or a microscope. Although the visibility of a small object decreases with distance, such that a larger hole (such as 0.1 mm) would not be visible at a more normal viewing distance (about 30 cm or so), it would be desirable if second opening 44 has a diameter of no larger than about 50 μm.

Although a small second opening 44 is desirable, its size is limited by several factors. For example, the aspect ratio of each microhole 30 should be such that the filler material can completely fill microhole 30 and light can project from first opening 40 through second opening 44. Therefore, the thickness of panel 12 and the composition of the filler material can be a factor. Further, the size of microholes 30 is limited by the technology used to drill them. First opening 40 is also limited by similar factors and should be large enough so that light transmitted therein can reach second opening 44. For the example shown, panel 12 has a thickness of about 400 μm. Panel 12 has a thickness greater than the diameters of first and second openings 40, 44.

Optionally, microholes 30 can be cleaned after drilling to remove any debris or deposits formed during the machining process. The cleaning can be done accordingly to any known method.

Figure 2:
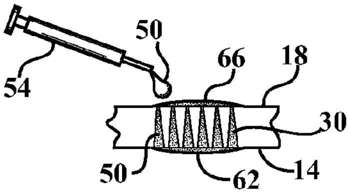
FIG. 2 is a schematic representation of filling the microholes drilled in the panel.

After drilling and optionally cleaning microholes 30, filler material 50 is applied to panel so as to pot, fill or occlude microholes 30. Here, occlude means to introduce material into the interior volume of each microhole 30 in such a fashion as to completely fill a cross-section of that microhole 30. Note that the entire interior volume may not be completely filled. Generally, however, excess material that extends beyond at least one of opening 40, 44 is present. In FIG. 2, for example, excess deposits 62 of filler material 50 extend along first surface 14, and excess deposits 66 of filler material 50 extend along cosmetic surface 18.

As shown, filler material 50 is applied to cosmetic surface 18 over second, optionally smaller openings 44 of microholes 30 using a syringe-type device 54. Due to the relatively low viscosity of the exemplary liquid phase filler material 50, the geometry of the conically-shaped microholes 30 and the force of gravity, filler material 50 flows into and through microholes 30 from cosmetic surface 18 to back surface 14 to occlude microholes 30. Other techniques to occlude microholes 30 using filler material 50 in a workable phase, liquid or otherwise, may be used. Examples include ink jet techniques and pad printing techniques. Filler material 50 could also be brushed over cosmetic surface 18. Further, although illustrated here as a manual syringe device 54, a computer-controlled dispensing system that controls movement of a syringe across panel 12 and controls the amount dispensed with each drop can be used as device 54.

Here, filler material 50 is an optically transparent, ultraviolet (UV)-curable, acrylate polymer that is in a liquid phase at the time of application to panel 12. An exemplary visible light transmissive material is AHS-1100 Developmental Material manufactured by 3M Company, St. Paul, Minn., which is substantially transparent when cured or set. Set refers to the process whereby filler material 50 transforms from a workable or flowable state, where it can be used to fill microholes 30, to a solid or relatively hardened state that typically adheres to the sidewall 34 so as to remain in place in microholes 30. Filler material 50 being in a workable or flowable state means that it is in a plastic (e.g. liquid) state such that it is able to be poured or otherwise inserted into a microhole 30 to conform to an interior shape thereof, thereby sealing microhole 30. Filler material 50 may be formed by mixing viscous agents that increase or decrease the viscosity of the main light transmissive material so as to provide an even and smooth application of filler material 50 on panel 12 and into microholes 30. Besides the exemplary visible light transmissive material, other plastics or polymers that would transmit visible light when set may also be used, including fillers that can be set by means other than UV radiation. Other materials that may be used include UV-settable polymers, or other polymers that set by exposure to radiation, epoxies or other multi-part compounds that set through chemical reactions, compounds that set through cooling or application of heat and compounds that set by evaporation of solvents or otherwise harden. Other details of filler material 50 are described below.

Alternatively, filler material 50 may be applied to back surface 14 so that filler material 50 flows through microholes 30 from back surface 14 toward cosmetic surface 18 in a similar manner as described. Although possible, this is less desired because of the likelihood that gravity will cause larger amounts of excess deposits 66 on cosmetic surface 18.

Microholes 30, filled with the polymeric solution, are polymerized by a UV curing system. That is, microholes 30 are exposed to UV light from a UV curing system as discussed in more detail hereinafter. UV curing system comprises UV light source 26 and optionally a controller 28. Controller 28 can be a standard microcontroller including a central processing unit (CPU), random access memory, read only memory and input/output ports. The method of controlling the UV light source 26 described herein can be implemented by programming instructions stored in memory and performed by the logic of the CPU. All or some of the functions could be implemented by hardware or other logic controllers, such as field-programmable gate arrays (FPGA). Although shown separately in FIG. 3, controller 28 could be an on-board controller of UV light source 26.

Figure 4:
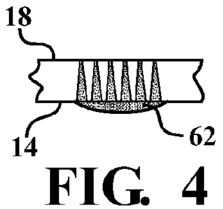
FIG. 4 is a schematic representation of the panel of FIG. 3 after cleaning material from its cosmetic side.

UV light source 26 emits light in a substantially perpendicular path onto back surface 14 to promote curing of filler material 50 in microholes 30 as discussed in additional detail hereinafter. While in theory other angles are possible, in practice those offset from normal by more than an insignificant amount contribute to a lack of uniformity in the curing of filler material 50 of microholes 30. This angle depends on the geometry of microholes 30 and panel 12. For example, where panel 12 has a thickness of about 455 μm, the opening in cosmetic surface 18 is about 19 μm and the opening in back surface 14 is about 83 μm, an offset from the normal incidence of up to about 11 degrees would be tolerated. Either before setting filler material 50 or during setting filler material 50, excess deposits 66 can be removed using mechanical means. For example, excess deposits 66 can be removed using a mechanical blade or squeegee wiped across cosmetic surface 18. As another example, an air knife can direct a compressed air stream onto cosmetic surface 18 of panel 12 to move excess deposits 66 from the immediate vicinity of microhole 30, with the moved excess deposits 66 then being removed using a vacuum nozzle. Alternatively, or in addition thereto, excess deposits 66 may be removed from cosmetic surface 18 through a simple isopropanol wipe. Excess deposits 66 can also be removed after setting, but this is less desirable as they may be at least partially set, making removal more difficult. In any event, the result is a relatively clean cosmetic surface 18 as shown in FIG. 4 where visible light is permitted to pass through microholes 30 in panel 12 by relatively transparent, cured filler material 50.

Optionally, excess deposits 62 on back surface 14 can be removed. However, this involves additional handling and does not visibly improve the performance or appearance of microholes 30 when viewed from cosmetic surface 18.

As mentioned previously, holes having non-uniform light intensity and/or non-uniform optical diameter when backlit can result from existing processes. Current methods, for example, apply a single exposure of a high-intensity UV light having a minimum duration of about 6 seconds for the illustrated embodiment. Heat is thereby generated within filler material 50. The inventor theorized that the cause of the non-uniformities was that the generated heat created a thermal gradient inside the polymeric solution that hindered the migration of monomers during curing. Accordingly, the inventor investigated a curing process that would consider the dynamics of monomers so that during and after curing, the monomers are given enough time for the diffusion. The resulting process adjusts the number of exposures, the exposure time and/or the intervals as described hereinafter and provides an improved uniformity in light intensity and optical diameter over current methods. Without being bound by theory, it is believe that embodiments of the invention improve the homogeneity of the polymerization or cross linking of monomers in filler material 50, thus resulting in more uniform results between microholes 30.

The first step of controlling exposure by an energy source is to characterize the energy source relative to filler material 50. For example, since filler material 50 is UV-curable, the energy source used is UV light source 26. UV light source 26 can be a broad spectrum UV source including a mercury vapor short-arc lamp or one centered at a relatively long wavelength (such as 393 nm) within the UV spectrum with a narrow pass band. In general, longer wavelengths within the spectrum of UV light source 26 result in a shorter cure time. One possible UV light source 26 is the Super Spot MK III from Lightwave Energy Systems Co., Inc., of Torrance, Calif. Another possible light source is the Firefly UV LED curing product from Phoseon Technology of Hillsboro, Oreg.

Regardless of the energy source, it is desirable that its strength (here, its light intensity) be set within maximum and minimum values. If the intensity is too high, non-uniformity increases. This is because, first, a gap results can result between the cured material and sidewall 34. Second, discoloration is common, presumably but not necessarily due to focal lensing of filler material 50 within the material as it cures. Too low an intensity results in inadequate and/or incomplete polymerization. Again, this results in discoloration and non-uniformity between microholes 30. These maximum and minimum values are based, generally, on results from a conventional single exposure used to set filler material 50 and can be obtained by the manufacturer and/or can be obtained from experimentation. For example, a single fiber leading light from a mercury lamp with 700 hours of use to one inch from back surface 14 results in a measured intensity of 600 $mW/cm^2$ in the area of microholes 30. Such an intensity causes discoloration, making it more desirable to locate the fiber about 1.5-2 inches from back surface 14 so as to reduce the intensity to no more than about 300 $mW/cm^2$.

Figure 3:
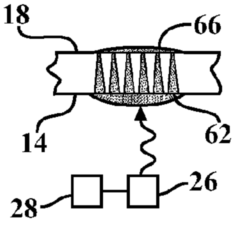
FIG. 3 is a schematic representation of curing the material used to fill the microholes drilled in the panel according to one embodiment of the present invention.

As shown in FIG. 3, UV light source 26 emits light in a direction substantially normal to back surface 14. Although UV light source 26 could direct light toward cosmetic surface 18, this is less desirable due to the setting of excess material 66, which makes it harder to remove and affects the appearance of cosmetic surface 18. UV light source 26 is generally stationary during each exposure and remains in the same position for second and any subsequent exposures so as to promote uniformity. Where the area of the microholes 30 to be exposed is less than about 5 $mm^2$ (depending on the thickness of panel 12 and the distance of UV light source 26 from back surface 14), UV light source 26 can be placed so as to shine evenly over the entire area at the normal incidence. In FIGS. 6-10, for example, the microholes 30 exposed were located in a substantially planar portion of panel 12 having an area of about 1×5 mm, and UV light source 26 applied light at about 1.5-2 inches from back surface 14 when using a mercury lamp as described above. The distance would depend on the power of UV light source 26. For example, a similar intensity to that applied by the mercury lamp would result where a UV LED is applying light at about one inch from back surface 14.

Figure 6:
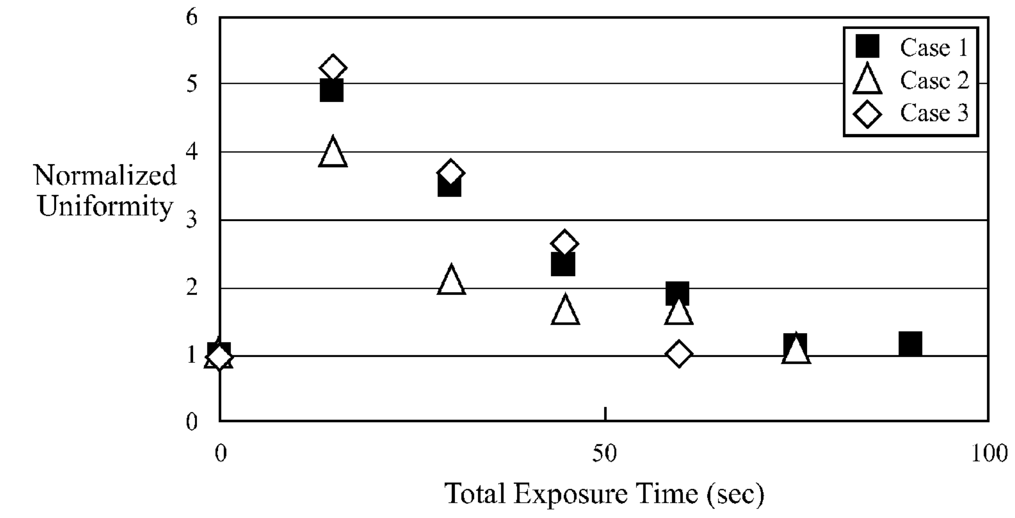
FIG. 6 is a graph comparing the number of exposures of the fill material to the normalized uniformity of the light emitted from the filled microholes.
Figure 7:
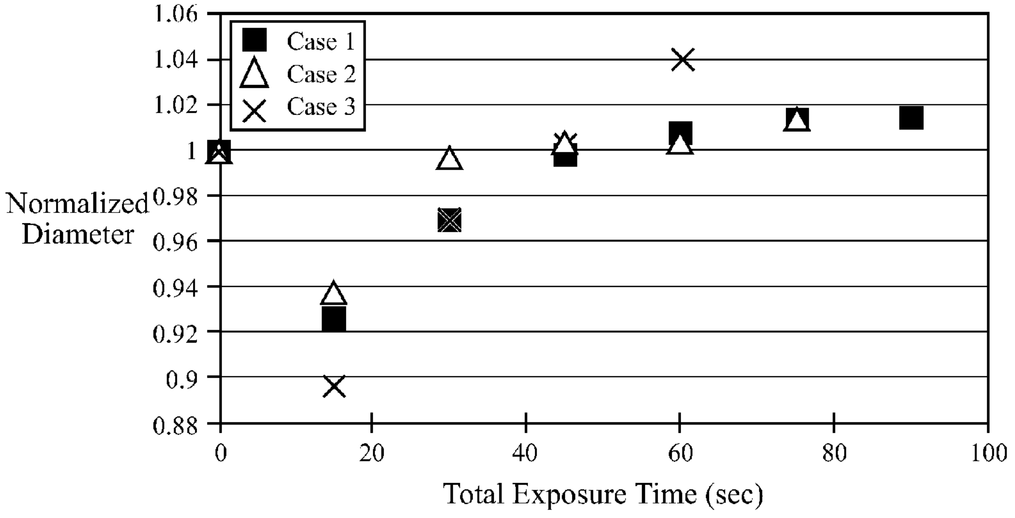
FIG. 7 is a graph comparing the number of exposures of the fill material to the normalized diameter of the filled microholes.

FIGS. 6 and 7 illustrate results for three different samples, cases 1-3, where multiple exposures, each having a duration less than that of a conventional single exposure, were applied to the substantially planar portion of panel 12 as described with respect to FIGS. 1-5. Each graph shows total exposure time on the X-axis, while the Y-axis shows normalized uniformity in FIG. 6 and normalized diameter in FIG. 7.

For each test case 1-3, an initial value was measured of the average light (i.e., a spot) emitted from microholes 30 as viewed from cosmetic surface 18 after occluding microholes 30 with filler material 50 and while filler material 50 was in the workable state. These values were measured as grey-scale values by a conventional light meter at a fixed distance from cosmetic surface 18. Uniformity in the light emitted was calculated by multiplying the standard deviation of the flux over the mean value by 100. The value of each at time 0 was used to normalize measured values for each case. Accordingly, in FIG. 6, the normalized uniformity at time 0 is shown as one (1) for each case.

Similarly, for each test case 1-3, an initial value was measured of the average diameter of light (i.e., a spot) emitted from microholes 30 as viewed from cosmetic surface 18 after occluding microholes 30 with filler material 50 and while filler material 50 was in the workable state. These values were measured using an image captured by a two-dimensional (2D) image sensor located at a fixed distance from cosmetic surface 18. Diameter for each case was the average value of the light spot of all microholes 30. The average value of each at time 0 was used to normalize the measured average for each case. Accordingly, in FIG. 7, the normalized diameter at time 0 is shown as one (1) for each case.

After measuring light level and diameter at time 0 for each case, setting filler material 50 was started. The duration of each exposure was 15 seconds. After each exposure N, the values were measured and plotted against the total exposure time. Note that the amount of time required to obtain the data for measurement between each exposure was 15-20 seconds. As can be seen in FIGS. 6 and 7, the general trend is that, as the number N of exposures increases, the uniformity of light and diameter increases. Each exposure should have a length less than that that would be used for a single exposure in conventional processing.

In the tests shown in FIGS. 6 and 7, each exposure was followed by an interval where filler material 50 was not exposed to the setting source, here UV light. This interval is herein called a rest or idle interval. Herein, the period from the start of an exposure to the end of the following idle interval is called an exposure cycle.

Figure 8:
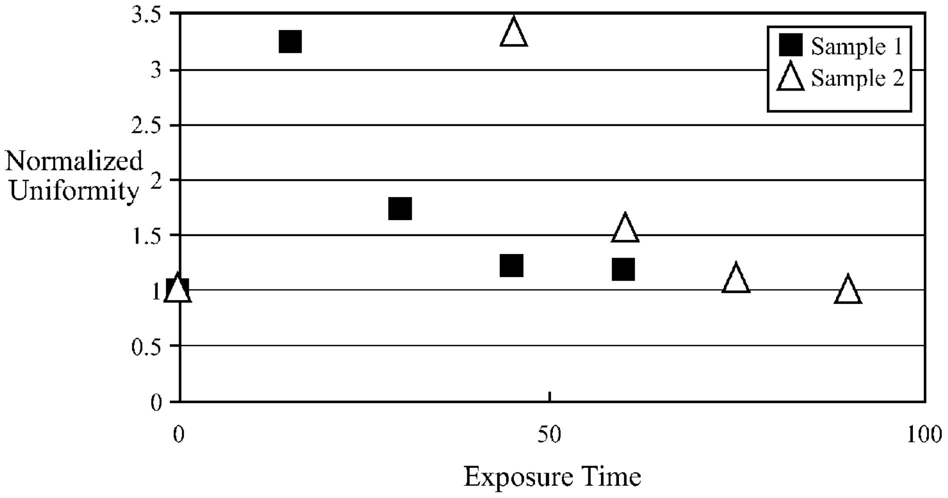
FIG. 8 is a graph comparing the same dose of exposures with and without rest intervals to the normalized uniformity of the light emitted from the filled microholes.
Figure 9:
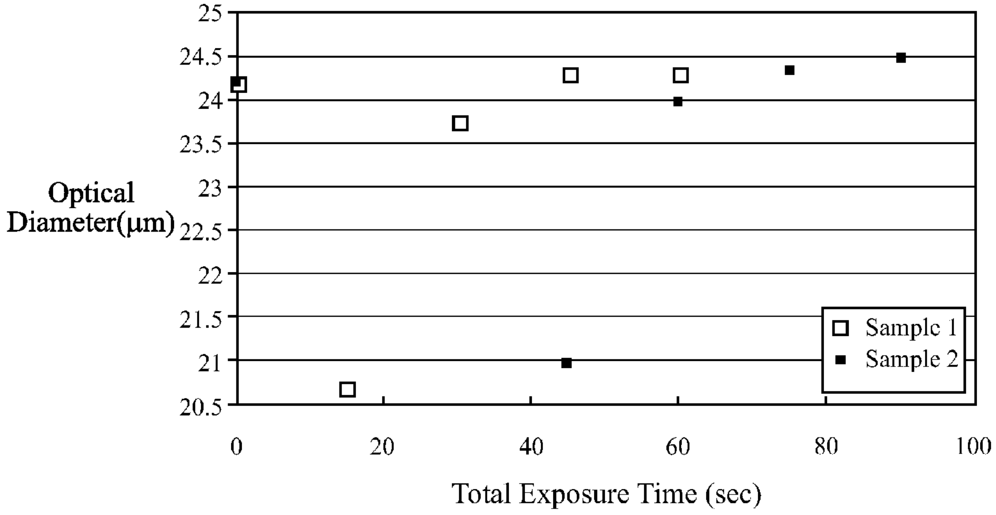
FIG. 9 is a graph comparing the same dose of exposures with and without rest intervals to the optical diameter of the filled microholes.

FIGS. 8 and 9 compare results from two samples with the same total exposure time against a measure of uniformity. In FIG. 8, for example, uniformity of the emitted light through filler material 50 after filling and before setting is used as a normalizing value for the measures after exposure as in FIG. 6. FIG. 9 measures the diameters as described with respect to FIG. 7. However, FIG. 9 plots the actual average diameter at each measurement point instead of the normalized average diameter as in FIG. 7.

In FIGS. 8 and 9, four exposure periods of 15 seconds were followed by an idle interval of about 30 seconds for sample 1. At the end of 30 seconds, the emitted light level and diameter were measured. In FIG. 8, the calculated normalized uniformity is shown after each of the four exposure periods in comparison to that of sample 2, which experienced a single exposure period of 45 seconds followed by an idle interval of about 30 seconds. Similarly, in FIG. 9, the calculated average diameter of sample 1 is shown after each of the four exposure periods in comparison to that of sample 2, with the single exposure period of 45 seconds followed by the idle interval of about 30 seconds. As can be seen, the inclusion of an idle interval results in greater uniformity in emitted light over the same exposure time. Note also that, in comparing FIG. 8 with FIG. 5, the idle interval was longer, but fewer exposures were required to reach a relatively uniform emitted light level. A similar result is seen when comparing FIG. 9 with FIG. 6. That is, the idle interval was longer, but fewer exposures were required to reach a relatively uniform diameter. Additionally, the fourth exposure period shows that there is a point where further improvement to uniformity is minimal. One could characterize this as the process of polymerization reaching saturation.

FIGS. 8 and 9 also show some additional test points for sample 2, which was initially exposed to the single exposure of 45 seconds. For each of these subsequent test points, the exposure cycle was, like the testing of the sample 1, 15 seconds for the exposure period and about 30 seconds for the idle interval. These additional points further demonstrate the saturation mentioned previously and demonstrate the rapid improvement in uniformity after at least one idle interval is followed by another exposure period.

Figure 10:
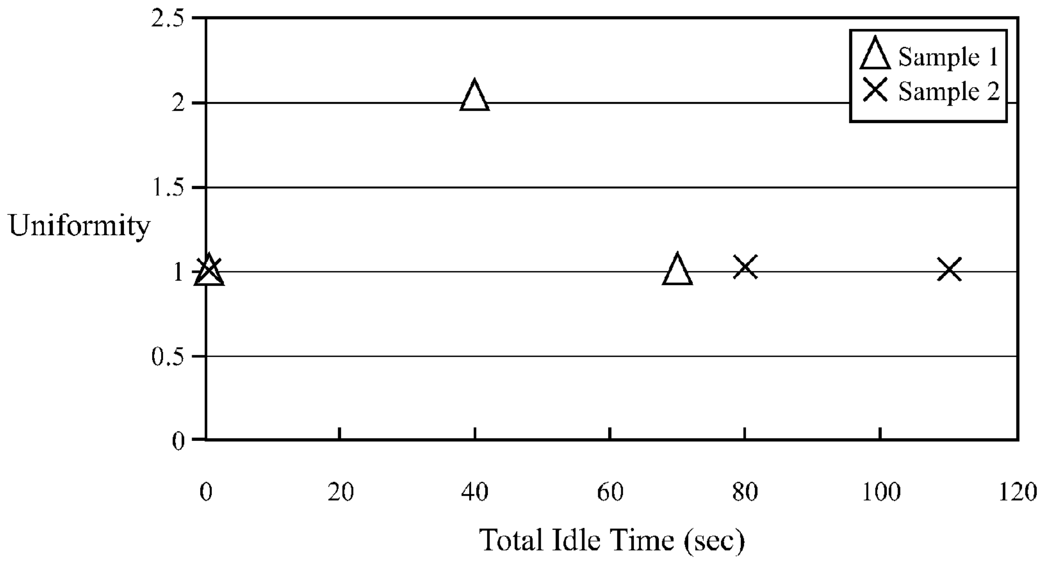
FIG. 10 is a graph comparing the same dose of exposures with different intervals to the normalized uniformity of the light emitted from the filled microholes.

FIG. 10 compares results for two samples where the number of exposures and the total exposure time are the same, but the idle interval is different. In each sample, the initial number N of exposures is five, and the exposure time is 15 seconds. In sample 1, the idle interval was 10 seconds. In sample 2, the idle interval was 20 seconds. As can be seen from the graph of total idle time versus the normalized uniformity of the emitted light from cosmetic side 18, the increase in the time period of idle interval results in improved uniformity. An additional exposure cycle for sample 2 results in no change in uniformity, while an additional exposure cycle for sample 1 results in further improvement in uniformity.

Collectively, FIGS. 5-10 demonstrate that length of the idle interval in each exposure cycle is more critical to the uniformity of the outcome than the exposure time of the cycle. A maximum idle interval exists for filler material 50 after which additional exposures cycles do not contribute to improved uniformity. A minimum idle interval also exists below which there is insufficient cooling of filler material 50 to provide the desired improvement in uniformity. These values depend on the content of filled material 50, the dimensions of microhole 30, the characteristics of the source used to set filler material 50, the length of each exposure, etc. Accordingly, minimum and maximum values for the idle interval can be determined experimentally in a like manner to the examples described.

As mentioned briefly above, suitable light transmissive materials are polymeric materials that can be disposed within microholes 30 in a flowable or workable state and can be subjected to suitable polymerization reaction(s) in situ. The polymerization reaction(s) may include any suitable reactions that will yield a polymeric material with suitable optical transmission characteristics such as the ability to transmit visible light as described herein and/or to appear substantially transparent. Typically, the polymerization reaction employed will include at least one polymerization process that includes radiation cross-linking and/or photochemical induced cross-linking.

In various embodiments, such as those described in detail herein, the polymerization process employed will be light-induced cross-linking. In certain specific embodiments, it is contemplated that the light-induced cross-linking processes utilize light in the UV spectrum as described above. The light transmissive polymerized material ultimately present in microholes 30 will be one that was photo initiated by UV light from a composition that includes suitable cyclic and linear aliphatic esters in combination with suitable epoxy acrylate oligomers. The starting material can include suitable photo initiators as desired or required as well as various reaction regulators and modifiers. Such materials may be fully or partially consumed as a result of the polymerization reaction.

In specific embodiments, it is contemplated that the cured polymerized material that is present in microholes 30 will be polymerized by a process in which the material is exposed to episodic exposure to UV lighting device 26. As described above, the episodic exposure employed includes at least one interval that includes a period of UV exposure, an idle or rest interval and a second period of UV exposure. It is contemplated that alternating idle intervals with UV exposure periods can occur for several iterations or cycles. In certain applications, the polymeric material is subjected to a UV exposure of between 15 and 30 seconds followed by an idle interval of between 15 and 30 seconds with no UV exposure and a second UV exposure of between 15 and 30 seconds. UV exposures and idle intervals having a shorter duration, such as 5 seconds, are also possible, but this may require more applications. Particularly with UV lighting device 26 being a UV LED lighting device, a high repetition mode is possible.

The present disclosure broadly describes a panel. A substantially planar portion thereof includes a first planar surface and a second planar surface opposed to the first planar surface. A plurality of microholes pass from the first planar surface to the second planar surface, and each microhole communicates with first and second apertures defined in the respective planar surfaces and has an internal surface therebetween. A light transmissive polymeric material is disposed within each microhole and has a first outer surface substantially coplanar with the first planar surface of the body, a second outer surface opposed to the first outer surface and a central body disposed therebetween. The central body of the light transmissive polymeric material has an outer central surface in contacting engagement with the internal surface of a respective microhole.

The light transmissive polymeric material utilized in one embodiment will be one that has at least 5% repeating units derived from UV curable epoxy acrylate oligomers with the polymeric material exposed to at least two discrete intervals of UV exposure. That is, the light transmissive polymeric material in one embodiment has a polymeric chain wherein at least 5% of components are derived from UV curable epoxy acrylate oligomers exposed to at least two intervals of UV exposure. The UV exposures can be centered at a wavelength of between about 365 nm and about 405 nm. A rest or idle interval with no UV exposure occurs between each exposure.

More preferably, the light transmissive polymeric material includes repeating units derived from UV curable epoxy acrylate oligomers in an amount greater than 10% of the polymeric chain and further has at least 20% of the polymeric chain derived from aliphatic esters and 5% of the polymeric chain derived from cyclic aliphatic esters. The light transmissive polymeric material can further include at least 0.25% of the polymeric chain derived from aliphatic silanes.

The filled material 50, when polymerized, functions like a light pipe, transmitting light directed at back surface 14 through openings in cosmetic surface 18 for viewing of a pattern formed by microholes 30 in panel 12. Accordingly, it does not function as a lens. This means that the polymerized material contains polymeric units oriented such that the incidence angle of transmitted light is substantially 0 across the outer surfaces of the light transmissive polymeric material present in each microhole 30.

Figure 11:
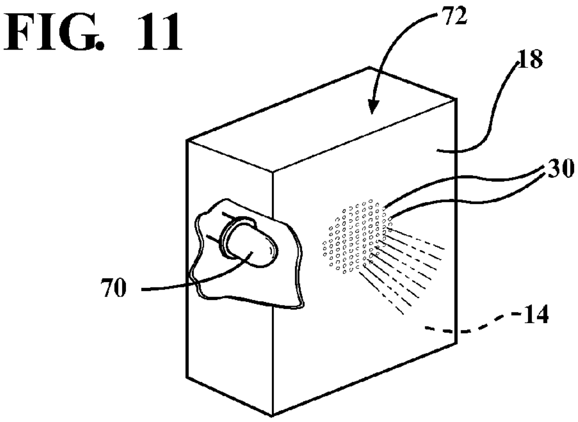
FIG. 11 is a schematic representation of a housing utilizing a light transmissive panel including filled microholes.

The set, or cured, filler material 50 from the method results in protected microholes 30 capable of transmitting light through panel 12. The use of microholes 30 and an optically transparent filler material 50 set with idle intervals as described herein produces a smooth and continuous panel surface to the naked eye that is capable of displaying controlled images in a variety of patterns through microholes 30 from interior illumination, as shown in FIG. 11. FIG. 11 illustrates a panel 12 including a back light 70, which may be an LED, fluorescent or incandescent light, or other lighting device. Panel 12 may be a section inserted into a larger housing or may be an integral section of housing 72 as shown in FIG. 11.

Panel 12 can be used in all manner of applications including hand-held electronic devices, for example, MP3 players, computers, cellular phones, DVD players and the like. The disclosed method and panel are applicable in virtually all applications where a visually continuous and uninterrupted panel surface is desired having the capability to produce illuminated messages, images or other perceptible characteristics or patterns for a user.

While the method has been described in connection with certain embodiments, it is to be understood that the method is not to be limited to the disclosed embodiments but, on the contrary, is intended to cover various modifications and equivalent steps and arrangements included within the scope of the appended claims.

What is claimed is:

1. A method of manufacturing a panel, comprising:

occluding a plurality of microholes arranged in a pattern with a light transmissive polymeric material, the light transmissive polymeric material being in a workable state and the plurality of microholes extending from a first opening in a first surface of a substantially planar area of the panel to a second opening in a second surface of the substantially planar area opposite to the first surface, each of the first opening and the second opening having a diameter smaller than a thickness of the substantially planar area; and setting the light transmissive polymeric material occluding the plurality of microholes from the workable state to a set state in which the light transmissive polymeric material is secured to an interior surface of the plurality of microholes by exposing the light transmissive polymeric material to an energy source for a first exposure period, providing a first idle interval wherein the light transmissive polymeric material is not exposed to the energy source after the first exposure period and exposing the light transmissive polymeric material to the energy source for a second exposure period after the first idle interval; and wherein a length of the first idle interval is such that the light transmissive polymeric material in the set state transmits light through the plurality of microholes with a uniformity substantially similar to a uniformity that the light transmissive polymeric material in the workable state transmits light through the plurality of microholes.

2. The method of claim 1 wherein the light transmissive polymeric material is an ultra violet (UV)-curable material and the energy source is a UV light source.

3. The method of claim 1 wherein the panel comprises aluminum or anodized aluminum.

4. The method of claim 1 wherein the first idle interval is at least as long as each of the first exposure period and the second exposure period.

5. The method of claim 1, further comprising:

providing a second idle interval wherein the light transmissive polymeric material is not exposed to the energy source after the second exposure period; and wherein setting the light transmissive polymeric material occluding the plurality of microholes from the workable state to the set state is completed after the second idle interval.

6. The method of claim 1 wherein the first exposure period and the first idle interval together form an exposure cycle; and wherein setting the light transmissive polymeric material occluding the plurality of microholes from the workable state to the set state comprises:

performing the exposure cycle at least two times after the first idle interval starting with the second exposure period.

7. The method of claim 6 wherein an idle interval of each exposure cycle is longer than an exposure period of each exposure cycle.

8. The method of claim 6 wherein an idle interval of each exposure cycle has a same length as an exposure period of each exposure cycle.

9. The method of claim 1, further comprising:

applying energy from the energy source to only one of the first surface and the second surface.

10. The method of claim 9, further comprising:

arranging the energy source normal to the substantially planar area; and maintaining the energy source in a same position for each exposure period.

11. The method of claim 1 wherein the light transmissive polymeric material comprises UV curable epoxy acrylate oligomers in an amount of at least 5% and the energy source is a UV light source.

12. The method of claim 1 wherein the light transmissive polymeric material in the set state transmits light through the plurality of microholes with a uniformity substantially similar to a uniformity that the light transmissive polymeric material in the workable state transmits light through the plurality of microholes when an average of respective light intensities measured through the plurality of microholes when the light transmissive polymeric material is in the set state is substantially equal to an average of the respective light intensities measured through the plurality of microholes when the light transmissive polymeric material is in the workable state.

13. The method of claim 1 wherein the light transmissive polymeric material in the set state transmits light through the plurality of microholes with a uniformity substantially similar to a uniformity that the light transmissive polymeric material in the workable state transmits light through the plurality of microholes when an average of respective optical diameters of the plurality of microholes when the light transmissive polymeric material is in the set state is substantially equal to an average of the respective optical diameters of the plurality of microholes when the light transmissive polymeric material is in the workable state.

14. The method of claim 1 wherein each of the plurality of microholes is conically-shaped such that the first opening has a larger diameter than the second opening; and wherein occluding the plurality of microholes comprises applying the light transmissive polymeric material in the workable state to the second surface of the substantially planar area.

15. A method of manufacturing a panel, comprising:

occluding a plurality of microholes arranged in a pattern with a light transmissive polymeric material, the light transmissive polymeric material being in a workable state and the plurality of microholes extending from a first opening in a first surface of a substantially planar area of the panel to a second opening in a second surface of the substantially planar area opposite to the first surface, each of the first opening and the second opening having a diameter smaller than a thickness of the substantially planar area; and setting the light transmissive polymeric material occluding the plurality of microholes from the workable state to a set state in which the light transmissive polymeric material is secured to an interior surface of the plurality of microholes by:

exposing one of the first surface or the second surface to an energy source for a first exposure period;

providing a first idle interval wherein neither the first surface nor the second surface is exposed to the energy source; and exposing the one of the first surface or the second surface to the energy source for a second exposure period after the first idle interval, wherein the first idle interval begins at an end of the first exposure period and ends at a beginning of the second exposure period such that the first exposure period, the first idle interval and the second exposure period form a continuous time period.

16. The method of claim 15 wherein the first idle interval is longer than each of the first exposure period and the second exposure period, and the first exposure period and the second exposure period are equal in length.

17. The method of claim 15 wherein the first idle interval, the first exposure period and the second exposure period are equal in length.

18. The method of claim 15 wherein a length of the first idle interval is such that an average of respective light intensities measured through the plurality of microholes when the light transmissive polymeric material is in the set state is substantially equal to an average of the respective light intensities measured through the plurality of microholes when the light transmissive polymeric material is in the workable state.

19. The method of claim 15 wherein a length of the first idle interval is such that an average of respective optical diameters of the plurality of microholes when the light transmissive polymeric material is in the set state is substantially equal to an average of the respective optical diameters of the plurality of microholes when the light transmissive polymeric material is in the workable state.

20. The method of claim 1 wherein the first idle interval begins at an end of the first exposure period and ends at a beginning of the second exposure period such that the first exposure period, the first idle interval and the second exposure period form a continuous time period and wherein exposing the light transmissive polymeric material to the energy source for the first exposure period and exposing the light transmissive polymeric material to the energy source for the first exposure period comprises exposing one of the first surface or the second surface to the energy source for the first exposure period and the second exposure period.

* * * * *